This invention relates to an improved X-ray spectrograph utilizing a cylindrically curved analyzing crystal reflecting surface or ruled grating, hereinafter referred to as an analyzer.

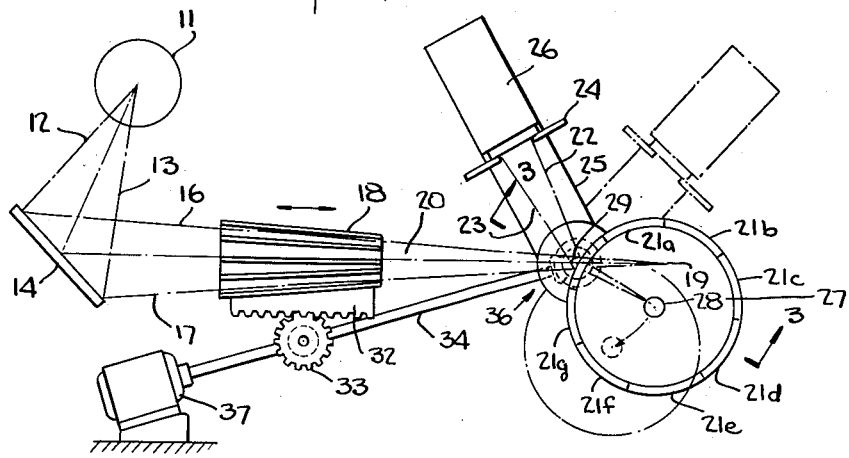
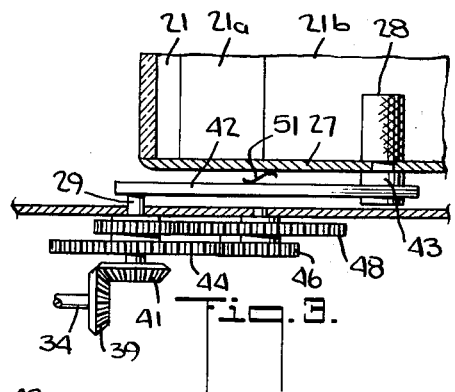
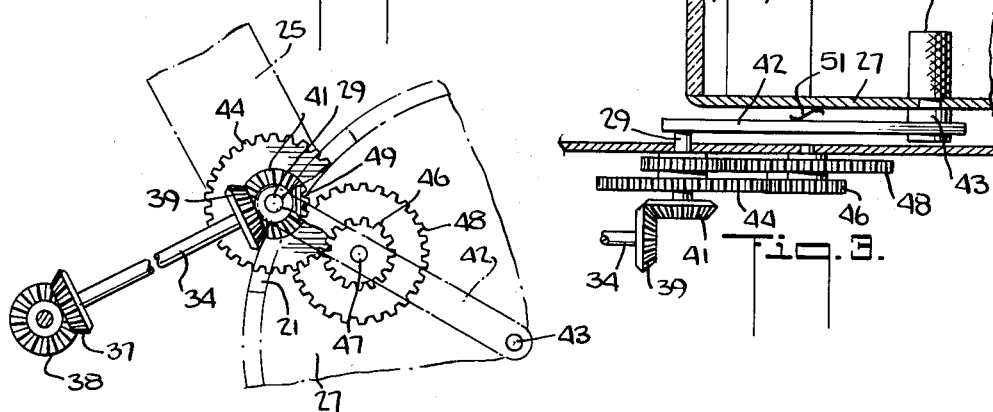
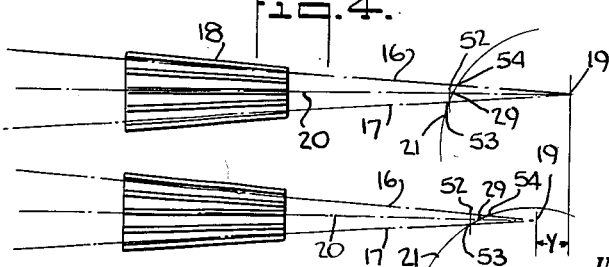
INVENTOR.
PLACIDO WILLIAM ZINGARO
BY
Gillette, Virgil & Eslinger
ATTORNEYS 3,124,681
FLUORESCENT X-RAY ANALYZER USING A CYLINDRICALLY CURVED ANALYZING CRYSTAL
Placido William Zingaro, Hartsdale, N.Y., assignor to Philips Electronics & Pharmaceutical Industries Corp., New York, N.Y., a corporation of Maryland
Filed Mar. 16, 1961, Ser. No. 96,215
3 Claims. (Cl. 250—51.5)

X-ray spectrographs comprise a source of X-rays, a specimen to be analyzed, an analyzer located in the path of the rays from the specimen, and a transducer sensitive to X-rays and capable of translating impinging X-rays into electrical signals or into a visual pattern. Ordinarily, the analyzer is pivoted so as to be rotatable through an angle, and the transducer, which may be, for example, a Geiger counter or scintillation counter or any other type of X-ray sensitive device, is also mounted so as to be rotatable in conjunction with the analyzer and in such a fashion as to rotate through twice as great an angle as the angle traversed by the analyzer.

For greatest efficiency it is desirable that the entire X-ray beam from the specimen, or at least as much of the beam as can be collimated along a prescribed path, strike the surface of the analyzer and be diffracted therefrom. However, as the analyzer is rotated so that the surface becomes more and more nearly parallel to the direction of travel of the X-rays, the cross-sectional area of the X-ray beam that can be intercepted by the analyzer becomes smaller and smaller until, finally, when the analyzer is parallel with the direction of the X-ray beam, it can intercept no X-rays at all. In fact, at some angle greater than zero, the analyzer becomes unable to intercept the entire X-ray beam and some of the X-rays on the edges of the beam will be lost. The larger the surface area of the analyzer, the smaller this angle can be, but there is a practical limit to the maximum size of at least certain types of analyzers. As a result, 16° is considered to be about the minimum angle for intercepting the entire beam in some presently available X-ray spectrographic equipment. The loss of edge X-rays obviously reduces the intensity of the beam diffracted by the analyzer and thus affects the results.

According to the present invention, the analyzer has a convex curved surface facing the specimen. Between the specimen and the analyzer is a set of Soller slits consisting of a large number of thin X-ray absorbent plates. Instead of being arranged exactly parallel to each other as is the usual case, the Soller slits of the present invention are spaced with respect to each other so that they converge toward a single, focal line. The analyzer is curved into a cylindrical section, the convex surface of which faces the constricted end of the Soller slits and the axis of which is parallel to the focal line. The analyzer is arranged to be rotatable about an axis parallel with the cylindrical axis but which coincides with one of the generatrices of the cylindrical surface. Any convenient form of X-ray detector can be used to detect the diffracted beam from the analyzer. The detector is coupled to the analyzer to rotate therewith but through twice as great an angle, as is the usual practice in X-ray spectrographs.

The invention will be more completely described in connection with the drawings in which:

FIG. 1 is a simplified representation of the basic optical and mechanical components of an X-ray spectrograph constructed according to the invention;

FIG. 2 shows the gearing arrangement for rotating the analyzer and the detector;

FIG. 3 shows a top-view of the gearing in FIG. 2;

FIG. 4 shows the path of X-rays when the analyzer is in one position; and

FIG. 5 shows the path of X-rays when the analyzer has been rotated to a different position.

The spectrograph in FIG. 1 comprises the usual X-ray source tube 11 which emits X-rays in a region bounded generally by the lines 12 and 13. A specimen 14 is placed within the region illuminated by X-rays. X-rays will be emitted by the sample over a wide angle, but some of those within the region bounded by the lines 16 and 17 are permitted to pass through a convergent Soller slit system 18, which comprises a plurality of almost-parallel plates of material that is substantially impervious to X-rays. The slits converge toward each other so that the only X-rays that can pass through the Soller system 18 are those that converge along the paths 16 and 17 and other paths between them that converge to a common focal line 19 on an X-ray optical axis 20. Because line 19 is viewed from the end, it appears in FIG. 1 as a point.

In actual fact the X-rays will not normally reach the line 19 itself but will be intercepted by an analyzer 21 and will be diffracted thereby. The diffracted beam is bounded by the lines 22 and 23 and includes a diverging wedge-shaped region therebetween. This beam passes through a limiting slot in a plate 24 and into a detector 26, which may be of any conventional type and which is supported on an arm 25.

The analyzer 21 is shown as one sector of a cylinder mounted in a holder 27 and composed of a plurality of sectors including sector 21 and sectors 21a–21g. These sectors may be made of different X-ray analyzing materials, such as, for example, mica, topaz, sodium chloride crystals, lithium fluoride crystals, ammonium dihydrogen phosphate crystals, ruled gratings, and others which are chosen for their different characteristics as analyzers. The holder 27 may be rotated by a knob 28 to place any of the analyzers 21a–21g in the position occupied by analyzer 21 in the drawing.

The analyzer holder 27 is rigidly attached to a shaft 29 to be rotated as the shaft turns. In accordance with the basic principles of this invention the X-ray optical axis 20 passes through the axis of the shaft 29. The latter axis is coincident with one of the generatrices of the cylindrical outer surface of the analyzers 21–21g, and is spaced from the Soller slit system 18 by a distance that will make the perimetric X-ray beams 16 and 17 and each of the X-ray beams therebetween impinge upon their individual portions of the convex surface of the analyzer 21 at substantially the same angle. For this reason each component ray is diffracted at the same angle as each of the other component rays, and the diverging, wedge-shaped, diffracted beam has the same included angle as the impinging beam, assuming the diffracting atoms of the analyzing crystal lie in concentric, cylindrical layers.

The spacing between the Soller slit system and the analyzer 21 may be most easily determined by considering the condition that would make all of the X-rays between the perimetric beams 16 and 17 strike the face of the analyzer 21 perpendicular. Obviously this would mean that these beams would have to enter the cylindrical analyzer 21 along lines that would be radii of the cylinder, and this could only be true if the focal line 19 were coincident with the axis of the analyzer cylinder. Given this condition, the Soller slit system 18 could have as great an included angle as might be desired, since all of the X-ray beams passing through it would strike the face of the analyzer at the same 90° angle.

However, the spacing between the Soller slit system 18 and the analyzer 21, or more specifically, between the slit system and the axis of the shaft 29 about which the analyzer rotates, measured along the X-ray optical axis 20 cannot remain constant as the analyzer rotates to different angles. The reason for this is that in order to operate in accordance with the principles of the invention under which all of the included X-rays must strike the analyzer at the same angle, the distance between the Soller slit system 18 and the analyzer 21 must increase as the analyzer is tilted away from the perpendicular position just postulated to another position, such as that shown in solid lines in FIG. 1. In the latter position the whole analyzing cylinder holder 27 has been rotated about 30° clockwise around the axis 29 from the perpendicular position. In accordance with Bragg's law of diffraction, the detector 26 must be rotated through twice as great an angle, or in this case, about 60°, also clockwise. As the analyzer holder 27 rotates still further to the position indicated in dotted lines, the detector 26 also rotates to the position shown in dotted lines and the Soller slit system 18 must be withdrawn by a distance which is a function of the angle at which the analyzer 21 is rotated.

In order to withdraw the Soller slit system 18 back along the X-ray optical axis 20 the proper distance in relation to the rotation of the analyzer, some coupling system must be used. While many such systems will perform the necessary task, a simple one is shown consisting of a rack gear 32, on which the Soller slit system is mounted, meshing with a pinion gear 33 driven by bevel gears (not shown in FIG. 1) from a shaft 34. The shaft is attached to a gear system generally indicated by reference character 36 to the shaft 29 that rotates the analyzer 21 and to the arm 25 on which the detector 26 is mounted. For automatic investigation of a sample 14 the shaft 34 may be rotated by a motor 37.

The gearing arrangement is shown in greater detail in FIG. 2 where the shaft 34 is coupled at one end to a bevel gear 37, which meshes with a second bevel gear 38 connected to the pinion gear 33 (shown in FIG. 1). The other end of the shaft is connected to a bevel gear 39 that meshes with another bevel gear 41, which turns the shaft 29. The analyzer holder 27 is attached to the shaft 29 by means of a linkage, such as a bar 42, one end of which is rigidly attached to the axle 29 to move therewith and the other end of which supports a shaft 43 at the center of the holder 27.

A gear 44 is also attached to the shaft 29 to be rotated thereby, and this gear meshes with a second gear 46 journaled on a shaft 47 to rotate thereon. Another gear 48 is mounted on the same shaft 47 and is rigidly connected to the gear 46 to turn therewith. This gear 48 meshes with still another gear 49, which is journaled so as to rotate freely on the shaft 29 and which is connected to the arm 25 that supports the detector 26 (shown in FIG. 1). The purpose of the gears 44, 46, 48 and 49 is to obtain the necessary 2 to 1 increase in angular movement of the detector arm 25 with respect to the arm 42.

FIG. 3 shows a top view of the arrangement of gears and arms in FIG. 2. As may be seen in FIG. 3, the holder 27 is journaled on the shaft 43 and may be revolved by means of the knob 28 independently of rotation of the arm 42 about the shaft 29. This independent movement of the analyzer holder 27 makes it possible to bring various ones of the analyzers to the place indicated by analyzer 21. A detent spring 51 keeps the analyzer holder 27 from revolving inadvertently upon the shaft 43.

As a concomitant effect of forcing each of the converging components of the X-ray beam to strike the analyzer 21 at a common angle, the beam will always strike the same area of the analyzer, which is desirable. For one thing, anomalous effects caused by minute crystal imperfections, if the analyzer is a crystal, will be constant. For another thing, and perhaps more important, the spectrograph may be so proportioned as to use all of the available ray beam from the entire surface of the sample 14 at all angles of the analyzer without requiring extremely large analyzers, which may not be obtainable in some instances since there is a limit on the size of certain crystals.

FIGS. 4 and 5 show only the X-ray optics involved. As the analyzer 21 is rotated about the axle 29 so as to present an increasingly oblique surface to the impinging X-rays traveling along an axis and converging on the focal line 19, the projection, on a hypothetical plane 52, of the distance between points 53 and 54 at which the perimetric rays 16 and 17 strike the analyzer becomes smaller and smaller. If the length of a chord between points 53 and 54 is X, then the projection of this chord on the hypothetical plane 52 is approximately equal to $X \cos \theta$, where $\theta$ is the angle through which the analyzer 21 is rotated. When this angle approaches 90°, the projection becomes very small, and since the rays 16 and 17 must be held within this projection and further since the included angle between the rays 16 and 17 is constant because the Soller slit system 18 is a fixed structure, the Soller slit system 18 and the analyzing crystal 21 must be moved apart. The additional distance by which the Soller slit system and the analyzer 21 must be separated is indicated by the letter Y which shows the horizontal distance between the positions of the focal line 19 in FIG. 4 and in FIG. 5. These figures have been drawn with the shaft 29 (here indicated only by the axis of the shaft) in vertical alignment to illustrate the foregoing. While the analyzer 21 could be moved to the right along the X-ray optical axis 20, it is generally more convenient to move the Soller slit system to the left (as the elements are presented in FIGS. 4 and 5) in order to keep the convergent X-ray beam within the proper boundaries. At grazing instance the Soller slit system 18 is moved to the left by a distance of approximately equal to the radius of analyzer 21 so that both the perimetric rays 16 and 17 graze the surface of the analyzer. The total movement of the Soller slit system 18 is therefore approximately equal to the radius of the cylindrical analyzer 21.

What is claimed is:

1. An X-ray spectrograph comprising a source of X-rays traveling along an X-ray axis; a convergent collimator located on said X-ray axis to permit substantially only X-rays converging toward a focal point on said X-ray axis to pass through; an analyzer having a fixed curvature located on said X-ray axis with the convex surface of said analyzer facing said collimator, said X-rays striking a fixed, limited area of said convex surface, the radius of said surface being such as to make the X-rays strike all parts of said fixed, limited area substantially perpendicularly when the center of curvature of said surface is coincident with said X-ray axis at said focal point; means to rotate said analyzer about an axis that is perpendicular to said X-ray axis and is coincident with said convex surface within said area; and means coupled to said last-named means to change the distance between said collimator and said analyzer to permit said X-rays to strike substantially only said fixed, limited area of said analyzer as said analyzer is rotated.

2. An X-ray spectrograph comprising a source of X-rays to irradiate a specimen and to cause said specimen to emit X-rays along an X-ray axis; a convergent collimator located on said X-ray axis and comprising a plurality of nearly-parallel plates converging toward a focal line to permit only X-rays converging toward said focal line on said X-ray axis to pass through; a cylindrical analyzer having a fixed radius and having a cylindrical axis parallel to said focal line with the convex surface of said analyzer facing said collimator, said analyzer being spaced from said collimator so that said X-rays strike substantially perpendicularly upon a fixed, limited area of said analyzer when the axis of said analyzer is coincident with said focal line; means to rotate said analyzer about another axis coincident with one of the generatrices of said cylindrical surface within said limited area; means connected to said last-named means to move said collimator along said X-ray axis to keep said X-rays striking said fixed, limited area as said analyzer is rotated; and X-ray detector means mechanically connected to said analyzer to rotate therewith and through twice as great an angle as said analyzer to receive X-rays diffracted by said analyzer.

3. The X-ray spectrograph of claim 2 in which said analyzer comprises a plurality of sections of a cylindrical shell, each of said sections being made of different X-ray analyzing material, said analyzer being additionally rotatable about said cylindrical axis to bring selective ones of said sections into said limited area at a time.

References Cited in the file of this patent

UNITED STATES PATENTS

| | | |
|---|---|---|
| 2,540,821 | Harker | Feb. 6, 1951 |
| 2,791,698 | Dyroff | May 7, 1957 |
| 2,848,624 | Friedman et al. | Aug. 19, 1958 |